(12) United States Patent
Thackara

(10) Patent No.: US 6,216,939 B1
(45) Date of Patent: Apr. 17, 2001

(54) METHOD FOR MAKING A HERMETICALLY SEALED PACKAGE COMPRISING AT LEAST ONE OPTICAL FIBER FEEDTHROUGH

(75) Inventor: John Ingalls Thackara, Sunnyvale, CA (US)

(73) Assignee: JDS Uniphase Photonics C.V., Arnhem (NE)

( * ) Notice: Subject to any disclaimer, the term of this patent is extended or adjusted under 35 U.S.C. 154(b) by 0 days.

(21) Appl. No.: 09/224,474

(22) Filed: Dec. 31, 1998

(51) Int. Cl.$^7$ .......................... B23K 31/02; B23K 35/12; B23K 35/14
(52) U.S. Cl. .................. 228/124.6; 228/56.3; 228/246
(58) Field of Search ................ 228/124.6, 121, 228/186, 234.1, 246, 122.1, 123.1, 124.5, 56.3

(56) References Cited

U.S. PATENT DOCUMENTS

| | | | |
|---|---|---|---|
| 4,008,948 | * | 2/1977 | Dalgleish et al. ............ 350/96 C |
| 4,174,491 | | 11/1979 | Nakamura et al. . |
| 4,663,652 | * | 5/1987 | Nishizawa ..................... 357/74 |
| 4,741,796 | * | 5/1988 | Althaus et al. ............... 156/272.4 |
| 4,779,788 | | 10/1988 | Rossberg . |
| 4,798,439 | * | 1/1989 | Preston ......................... 350/96.2 |
| 5,061,035 | | 10/1991 | Rogers, Jr. . |
| 5,077,878 | * | 1/1992 | Armiento et al. ............... 29/25.02 |
| 5,163,108 | * | 11/1992 | Armiento et al. ............... 385/89 |
| 5,412,748 | | 5/1995 | Furuyama et al. . |
| 5,559,918 | * | 9/1996 | Furuyama et al. ............... 385/92 |
| 5,602,955 | * | 2/1997 | Haake ............................ 385/136 |
| 5,745,624 | * | 4/1998 | Chan et al. ..................... 385/91 |
| 5,881,198 | * | 3/1999 | Haake ............................ 385/136 |
| 5,896,481 | * | 4/1999 | Beranek et al. ................. 385/90 |

FOREIGN PATENT DOCUMENTS

| | | |
|---|---|---|
| 28 29 548 | 11/1979 | (DE) . |
| 0 645 651 A1 | 3/1995 | (EP) . |
| 56-151909 | 11/1981 | (JP) . |
| 57-103409 U1 | 6/1982 | (JP) . |
| 60-214310 | 10/1985 | (JP) . |
| 61-133909 | 6/1986 | (JP) . |
| 63-43110 U1 | 3/1988 | (JP) . |
| 63 085505 | 4/1988 | (JP) . |
| 1-94905 U1 | 6/1989 | (JP) . |
| 3-167510 | 7/1991 | (JP) . |
| 3-261902 | 11/1991 | (JP) . |
| WO 88/05551 | 7/1988 | (WO) . |

OTHER PUBLICATIONS

International Search Report/PCT/JP94/00532.

* cited by examiner

Primary Examiner—Patrick Ryan
Assistant Examiner—Kiley Stoner
(74) Attorney, Agent, or Firm—Dilworth & Barrese, LLP.

(57) ABSTRACT

The present disclosure pertains to a method for making a hermetically sealed package which includes a housing, a lid and a feedthrough for at least one stripped fiber. The method includes the following steps: 1) placing at least one optical fiber and at least one solder preform between the sealing surface of the lid and the sealing surface of the housing; and 2) sealing the assembly by applying pressure and heat so as to press the fiber (or fibers) into the solder.

12 Claims, 2 Drawing Sheets

Figure 1:
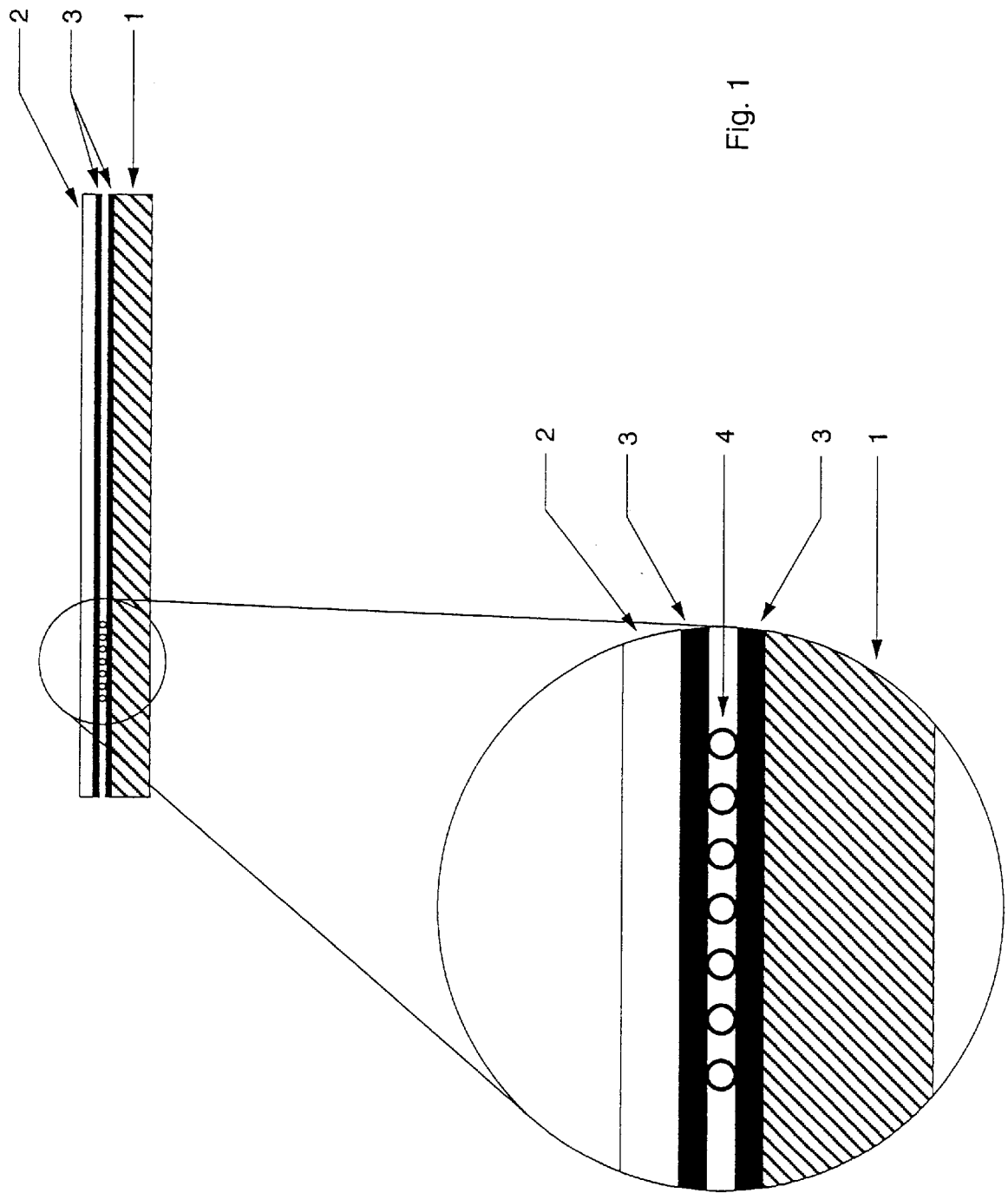

METHOD FOR MAKING A HERMETICALLY SEALED PACKAGE COMPRISING AT LEAST ONE OPTICAL FIBER FEEDTHROUGH

This application claims priority to provisional application 60/021,201, filed Jul. 3, 1996.

The invention pertains to a method for making a hermetically sealed package, which package comprises a housing, a lid, and a feedthrough for at least one stripped optical fiber.

A method for making a hermetically sealed package is known from U.S. Pat. No. 4,779,788. The method disclosed in this publication involves feeding an optical fiber through a hole in one of the metal walls of the package. Subsequently, excess solder in a molten state is provided outside the hole to form a solder body surrounding and adhering to the optical fiber. The solder body is also connected with the outside of the metal housing and with at least part of the length of the wall of the hole. During cooling the molten solder shrinks and the free surface of the solder body also shrinks under the influence of surface tension. The solder is drawn towards the hole and onto and around the glass fiber, thus hermetically sealing in the fiber.

It is common practice to use an array of optical fibers instead of one single fiber. An array of, e.g., seven optical fibers requires the making of at least seven holes and seven hermetical feedthroughs, for instance by the method disclosed in U.S. Pat. No. 4,779,788. Accordingly, the process for manufacturing flat packages is complicated and expensive. Not surprisingly, the hermetical feedthroughs are responsible for the greater part of the total costs involved in said manufacturing process.

U.S. Pat. No. 5,061,035 concerns a method for making a hermetically sealed fiber array comprising a bundle of optical fibers provided with a solderable metal coating (preferably nickel and gold) to ensure adhesion to a solder. The optical fiber bundle is placed in a supporting structure having a front face and a coated inner surface so that the end face of the optical fiber bundle is flush with the front face of the supporting structure. The assembly is then heated and fluxless solder is applied to the end face and allowed to wick between the individual fibers and the inner surface of the support. Preferably, the solder is sucked in by means of a vacuum on the back face of the supporting structure.

U.S. Pat. No. 4,174,491 relates to a method in which a metallized optical fiber is placed in a groove in a mount substrate. A keeper substate which is also provided with a groove is placed on top of the mount substrate so that the grooves snugly hold the optical fiber. The grooved substrates are welded together by means of a solder coating provided on their grooved surfaces. Subsequently, the interspace between the optical fiber and the substrates is filled up with a low fusing solder.

DE 28 29 548 discloses the deposition of a thin layer of indium and lead on both an upper and a lower substrate's surface. These layers are used to weld the said substrates together. After this welding step, a lid is hermetically welded onto the upper substrate. The assembly further comprises an optical fiber which is fed through grooves in the upper and lower substrates. After sealing of the lid, the space between the optical fiber on the one hand and the upper and lower substrates on the other hand is filled up with a low fusing solder.

U.S. Pat. No. 5,412,748 discloses a similar method. A fiber feedthrough between a cap and a submount is hermetically sealed in a separate process step after the cap has been soldered to the submount. It is described how an auxiliary solder is used for filling the space between the optical fiber and the cap. This auxiliary sealing solder can be formed by melting a solder having a relatively low melting point and injecting the solder into the gap using a capillary phenomenon.

It is an object of the present invention to provide a method for hermetically sealing packages which involves comparatively few and simple process steps. This object is achieved by the following process steps in the method described in the first paragraph:

placing the optical fiber or fibers and at least one solder preform between the sealing surface of the lid and the sealing surface of the housing sealing the assembly, at least around the optical fiber or fibers, by applying pressure and heat so as to press the fiber or fibers into the solder.

With this method, all the optical fibers in an array can be sealed simultaneously in a very efficient and effective manner. The seam obtained with the method according to the invention is (practically) impervious to moisture and other gases and easily meets the current standards.

Further, the hermetic fiber feedthrough(s) can be formed using conventional package housings or seal rings and lids and do(es) not require custom ferrules. The number of juxtaposed fibers in this type of feedthrough is limited only by the available package lid seam length and the fiber diameter.

A still further advantage of the present invention resides in the fact that welding or soldering the lid onto the housing is combined with making the fiber feedthroughs. Until now, attaching the lid to the housing and providing the fiber feedthrough were two separate processes.

Within the framework of the present invention the term "solder preform" includes, amongst others, separate rings of solder (adapted to the shape of the lid and/or the shape of the opening in the package body or housing) and relatively thick coatings on the lid sealing surface and/or the housing sealing surface. Said coating can, for instance, be achieved by reflowing solder onto the sealing surface(s) using a proper flux.

The solder of which the preforms are made should have the property that it wets both the optical fiber or fibers and the sealing surfaces of the lid and the housing. Examples of suitable solders are indium, indium/silver, indium/tin, and glass solder (ex Gould).

In order to further simplify the process and make an improved seam it is preferred to use more than one solder preform. Thus, a stack can be obtained comprising at least five elements, e.g., the package body or housing, a first solder preform, the fiber or array of fibers, a second solder preform, and the lid. Since the solder which is to form the seam is present on both sides of the fiber or fibers, it is easier to ensure that it reflows completely around the fiber or fibers. Thus, the chance of obtaining an end product not suitable for sale is reduced.

Irrespective of the number of solder preforms, it is preferred that the (total) thickness of the preform or preforms exceeds the diameter of the stripped fiber, preferably at least by 20 percent. Thus, a hermetic seal with solder both below and above the fiber is ensured even when both the sealing surface of the lid and the sealing surface of the package body or housing are perfectly flat.

In a preferred embodiment, the optical fiber or fibers are solder coated prior to sealing the package. The solder used to precoat the fibers must have the property that it wets glass in a molten state. In this respect, suitable solders are, e.g., indium, indium/silver, and indium/tin solders. With solders of this type, the precoating of the fibers can be accomplished by simply dipping the stripped section of the optical fibers into the molten solder.

As mentioned, the package is sealed through the application of heat and pressure. During this sealing step all or nearly all the voids between the solder and the fiber or fibers are eliminated. In the process according to the invention, it is also possible to apply additional heat after the sealing step, for instance, to further melt the solder and improve the continuity of the solder seam between the package body, the lid, and the optical fiber or fibers.

Depending on the material used for the elements of the package, it can be advantageous to use an intermediate between the housing or the lid and the solder preform or the fibers. For instance, if the housing is made of a ceramic material, a metal sealing ring or brazing pad can be provided around the opening of the housing to enhance the adherence of the solder. The person skilled in the art will have no difficulty in selecting an appropriate combination of materials.

With the method according to the invention it is also possible to place a further solder preform on top of the fiber or fibers and a further layer comprising at least one fiber on top of said further solder preform. Thus, several layers containing at least one fiber each can be stacked one on top of the other and sealed simultaneously.

The invention further pertains to a hermetically sealed package obtainable by the method as described above, which package comprises a housing or package body and a lid (preferably both having a flat sealing surface) sealed onto it by means of a continuous solder seam, through which solder seam at least one fiber is fed.

This package allows very efficient manufacture, is inexpensive, and does not require custom ferrules or the like. Also, the width of a fiber array feedthrough can be made very small (because ferrules or grooves are not necessary), thus reducing the package size in the dimension of the array.

It should be noted that JP 63 085505 concerns a method for welding and fixing optical fibers into V-grooves formed on a substrate. Heating elements consisting of a high resistance material are deposited into the grooves and, in turn, a "low melting metal" such as a solder is plated on the heating elements. The optical fibers are coated with a welding metal such as gold and placed in the grooves. During subsequent heating by means of the heating elements, a plate is pressed onto the fibers and the "low melting metal" is melted. Thus, the optical fibers are adhered to the metal. A hermetically sealed package is not disclosed.

FIG. 1 shows schematically an assembly according to the invention just prior to the application of heat and pressure. The assembly comprises a package body or housing 1, a lid 2, two solder preforms 3, and an array 4 consisting of seven individually precoated optical fibers.

Figure 2:
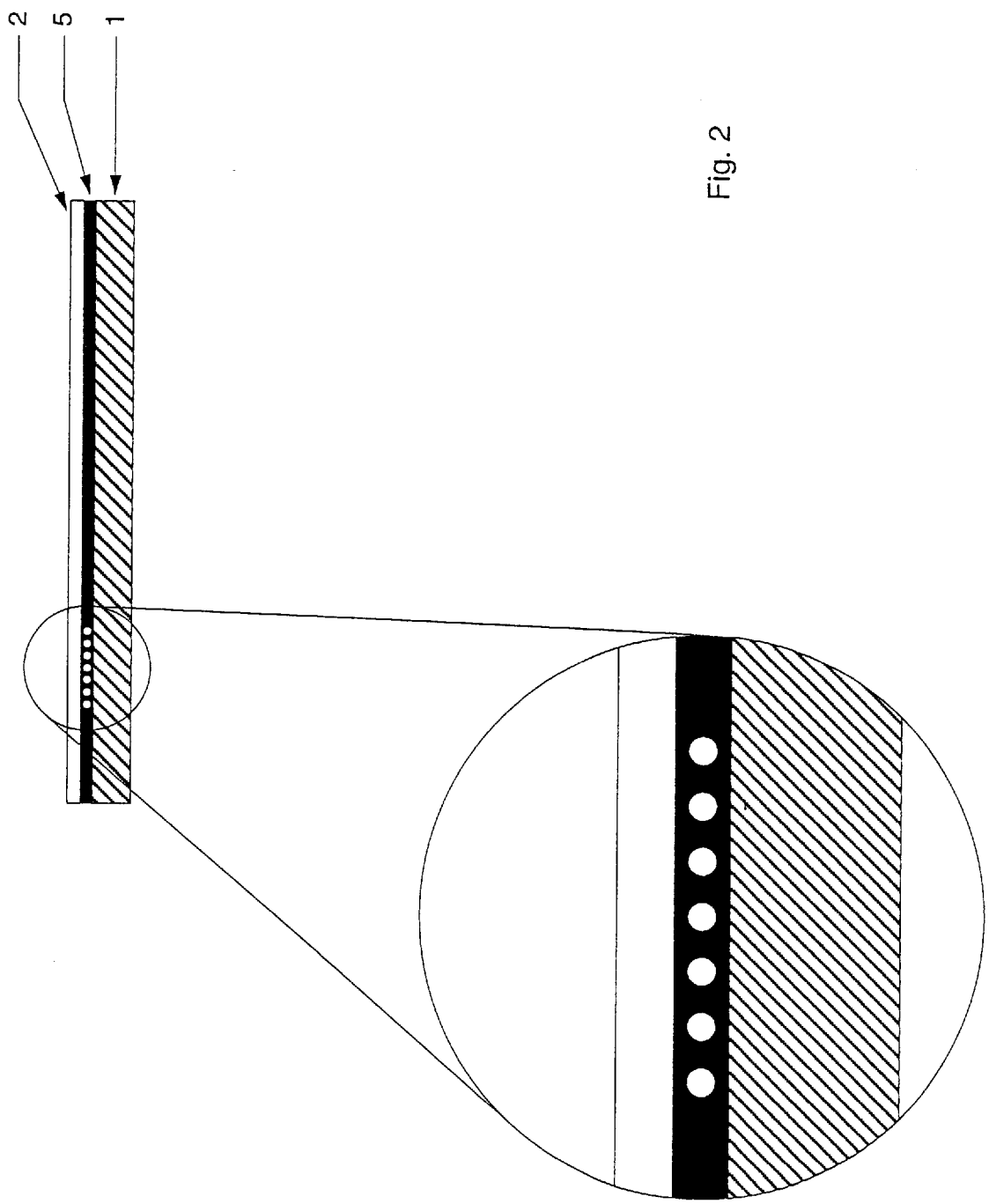

FIG. 2 shows the assembly of FIG. 1 after the application of heat and pressure. The solder preforms 3 have formed a continuous solder seam 5.

The invention will now be illustrated by way of a further, more detailed example. As a matter of course, the invention is in no way restricted to this example.

EXAMPLES

Hermetically sealed packages with up to 9 fiber feedthroughs were made with the process described below. The packages had a single fiber feedthrough at the input side and a fiber array feedthrough containing as many as 8 fibers on the output side. All of the package housings described hereinbelow were made of alumina and had gold over nickel plated Kovar seal rings brazed onto gold plated pads on the package sealing surface. The lids were also made of Kovar with gold over nickel plating. The optical fibers were all Corning SMF-28. Pure indium was used as the solder to make the seals. The fiber feedthrough fabrication and package sealing process was comprised of the following steps:

1. Indium was applied to the top surface of the package seal ring and to the sealing surface of the lid by first coating the sealing surfaces with a thin layer of flux. Indium rings, each 0.010" thick, were then pressed onto the flux layers. The package housings and lids were placed in a nitrogen purged reflow oven and heated until the indium melted and completely wetted the sealing surfaces. The package bodies and the lids were allowed to cool to near room temperature in the oven. Flux residues were removed from the coated sealing surfaces in an isopropanol bath.

2. Both the input single fibers and the output fiber arrays were also coated with indium prior to package sealing. This was done by first stripping off the acrylate coating from the sections of the fibers or fiber arrays that would be sealed into the indium package/lid seam. The exposed silica surfaces of the fibers were cleaned with isopropanol and lens tissue and then blown dry. The cleaned portions were then slowly passed back and forth through molten indium on a glass stage which was heated from the bottom by a heated brass block and from the top by a heating element dipped into the indium. For the fiber arrays, the fibers were maintained in a linear array by external clamps. A stream of nitrogen was directed over and around the molten indium. After being in the molten indium for about 30 seconds (about 2 or 3 passes), the fibers or fiber arrays were removed and allowed to cool.

3. The fiber feedthroughs were formed by first positioning the indium coated sections of the fibers or fiber arrays over the package seal ring at the input and output locations and then holding them in place with external clamps. Next, the lid was positioned directly above the package seal ring and held in place by external guides. Heat and pressure were then applied to the input and output ends of the lids until the indium on the lid, then on the fibers, and finally on the package seal ring melted and flowed together to form a continuous indium seal between the seal ring and the lid and around the fibers. The heat was removed and the lid was held in place until the indium had frozen.

4. Except for a short, less than 1 cm long, section, all of the remaining sections of the package/lid seal were then formed using a similar application of heat and pressure. The short section was left unsealed to facilitate the bakeout of water and other volatiles from the package interior.

5. Bakeout of the package assembly was carried out under vacuum at 100° C. for 14 hours.

6. After bakeout, the package assembly was allowed to cool and was then transported directly into a nitrogen purged dry box. The package sealing was completed by applying heat and pressure to the remaining unsealed section until the indium on the lid and on the package seal ring melted and flowed together to form a continuous indium seal between the seal ring and the lid.

Sectioning of 8-fiber feedthroughs sealed with the above process clearly shows that the fibers are completely surrounded by indium and that the indium completely fills the space between the package and the lid. Packages having a 1-fiber input feedthrough and an 8-fiber output feedthrough sealed with the above procedure have been helium leak tested and then subjected to a number of environmental stress tests before being leak tested again. The leak rates measured before and after the environmental stress tests were all under the 1×10E-6 atm-cc/sec air equivalent standard leak rate limit specified by MIL-STD-883 for hermetic packages of the size sealed. These tests, and the associated package counts, include:

Low Temperature Storage (−40° C.), 920 hours: Two packages.

High Temperature Storage (71° C.), 600 hours: Two packages.

Temperature Cycling (−40 to 70° C., 20 cycles/day), 120 cycles: Three packages.

Thermal Shock (0 to 100° C. in water baths, 2 minutes per bath), 15 cycles: Five packages.

RGA has also been carried out on similar packages after sealing and after 15 cycles of 0 to 100° C. thermal shock in water baths. The measured water content was under the 5000 ppm limit specified by MIL-STD-883 for hermetic packages. These results clearly show that the process described above simultaneously forms robust hermetic seals around the optical fibers and between the package and the lid.

Optical transmission and return loss measurements have been carried out at 1.53 μm on fiber feedthroughs made with the above process. The loss per feedthrough was less than 0.05 dB. No return peaks above −70 dB were observed in CDR scans. The fiber sealing process described above, therefore, does not result in any cracking or microbending of the fibers.

What is claimed is:

1. A method for making a hermetically sealed package, which package comprises a housing, a lid, and a feedthrough for at least one stripped optical (fiber) fiber, wherein the method comprises the steps of:

placing at least one optical fiber between a sealing surface of the lid and a sealing surface of the housing along with a first solder preform between the at least one fiber and the sealing surface of the housing and a second solder preform between the at least one fiber and the sealing surface of the lid; and sealing the assembly and forming the hermetically sealed fiber feedthrough by applying pressure and heat so as to press the at least one fiber into the solder; and wherein said solder preforms provide solder which forms a hermetic seal completely surrounding the at least one fiber and filling an adjacent space between the housing and the lid.

2. A method according to claim 1, wherein the at least one optical fiber is solder coated prior to sealing the package, said solder preform being additional to the solder coating on the fiber.

3. A method according to claim 1, wherein the method includes an initial sealing step which leaves a section of joint between the housing and the lid unsealed, and, after the initial sealing step, the method further comprises baking out of the package to remove volatiles, and subsequently applying additional heat to melt the solder and to provide a continuously sealed joint.

4. A method according to claim 1, wherein the housing is provided with a sealing ring formed of solder, which forms the sealing surface of the housing and contacts and forms a seal against the fiber.

5. A method according to claim 1, wherein said solder preforms include coatings on the said sealing surfaces and on the at least one fiber.

6. A method according to claim 1, wherein prior to the sealing step, the method further comprises the steps of: placing a solder preform on top of the at least one fiber and placing a further layer comprising at least one fiber on top of a solder ring.

7. A method according to claim 1, wherein a thickness of the preform exceeds a diameter of the stripped fiber multiplied by the number of fiber layers.

8. A method according to claim 7, wherein the total thickness of the said preform or preforms exceeds the diameter of the stripped fibers by at least 20%.

9. A method according to claim 7, wherein the sealing surface of the lid and of the housing are both flat, and wherein the thickness of the preform or preforms exceeds the diameter of the stripped fibers by at least 20%.

10. A method for making a hermetically sealed package, which package comprises a housing, a lid, and a feedthrough for at least one stripped optical fiber, wherein the method comprises the steps of:

placing at least one optical fiber and at least one solder preform between a sealing surface of the lid and a sealing surface of the housing; and sealing the assembly by applying pressure and heat so as to press the at least one fiber into the solder, wherein, prior to said sealing step, the method further comprises the steps of: placing a solder preform on top of the at least one fiber; and placing a further layer comprising at least one fiber on top of a solder ring.

11. A method for making a hermetically sealed package, which package comprises a housing, a lid, and a feedthrough for at least one stripped optical fiber, wherein the method comprises the steps of:

placing at least one optical fiber and at least one solder preform between a sealing surface of the lid and a sealing surface of the housing; and sealing the assembly by applying pressure and heat so as to press the at least one fiber into the solder;

wherein a thickness of the preform exceeds a diameter of the stripped fiber multiplied by a number of fiber layers.

12. A method according to claim 11, wherein the sealing surface of the lid and of the housing are both flat, and wherein the thickness of the preform or preforms exceeds the diameter of the stripped fibers by at least 20%.

* * * * *